United States Patent [19]

Mutz

[11] Patent Number: 4,644,368
[45] Date of Patent: Feb. 17, 1987

[54] TACHOGRAPH FOR MOTOR VEHICLES

[76] Inventor: Gerhard Mutz, Waldstr. 23, D-7734 Brigachtal, Fed. Rep. of Germany

[21] Appl. No.: 830,517

[22] Filed: Feb. 14, 1986

[30] Foreign Application Priority Data

Feb. 14, 1985 [DE] Fed. Rep. of Germany ....... 3505068

[51] Int. Cl.⁴ .............................................. G01D 9/28
[52] U.S. Cl. ................... 346/33 D; 346/53; 346/60; 346/104; 340/52 F; 364/424
[58] Field of Search ................... 346/18, 33 D, 33 R, 346/50, 52, 53, 54, 59, 60, 80, 82, 95, 104, 134; 364/424, 401, 519; 377/16; 360/6, 2; 340/52 F

[56] References Cited

U.S. PATENT DOCUMENTS

| | | | |
|---|---|---|---|
| 3,792,445 | 2/1974 | Bucks | 346/33 D X |
| 4,067,061 | 1/1978 | Juhasz | 364/424 X |
| 4,083,052 | 4/1978 | Metcalf | 346/33 D X |
| 4,170,015 | 10/1979 | Elliano | 346/82 X |
| 4,258,421 | 3/1981 | Juhasz | 364/424 |
| 4,395,624 | 7/1983 | Wartski | 346/33 D X |

Primary Examiner—Joseph W. Hartary
Attorney, Agent, or Firm—Toren, McGeady and Goldberg

[57] ABSTRACT

The disclosed tachograph writes work data for motor vehicle work into a microprocessor-controlled EEPROM semiconductor memory mounted on a movable data card carried by the driver. A printing device prints out the content of a data card memory in the form of a tabular drive record in plain language. The face of the tachograph includes receiving slots located next to one another for the data cards of a driver and a co-driver, as well as a line display for guiding the driver as to how to key in information. A front slot in the face of the tachograph receives an unimprinted paper sheet. Two keys enter the work times, while the functions concerning the print-out of the driving record are controllable with a keyboard on the basis of information on the line display.

9 Claims, 5 Drawing Figures

FIG. 4

Drive record no. 79 of 1/22/1985
Josef Walcher, born 10/11/42 No. 41378 A

| date day/clock time | work time hour/min | distance Km | device No. | speed at $\Delta t =$ 1,0s | 10s |
|---|---|---|---|---|---|
| 19.  15.47 | 0.45* |  | 76 | 92 | 42 |
|      16.32 | 0.16* | 15.1 | 76 | 93 | 36 |
|      16.48 | 0.10 |  | 76 | 94 | 28 |
|      16.58 | 2.12* | 121.1 | 76 | 92 | 24 |
|      19.10 | 1.05 |  |  | 90 | 09 |
|      20.15 | 1.05* | 64.2 | 91 | 91 | 00 |
|      21.20 | 8.00 |  |  | 89 | 00 |
| 20.   5.20 | 3.20* | 142.4 | 91 | 87 | 31 |
|       8.40 | 0.30 |  | 91 | 86 | 41 |
|       9.10 | 4.00* | 184.2 | 91 | 87 | 46 |
|      13.10 | 0.50* |  | 91 | 85 | 41 |
|      14.00 | 25.00 |  |  | 82 | 79 |
| 21.  15.00 | 3.50* |  | 76 | 82 | 72 |
|  |  |  |  | 77 | 61 |
|      18.50 | 0.15 |  | 76 | 69 | 62 |
|      19.05 | 4.45* | 152.9 | 76 | 52 | 66 |
|      23.50 | 1.30 |  | 76 | 34 | 74 |
| 22.   1.20 | 3.38* |  | 76 | 00 | 81 |
|       4.58 | 3.42* | 189.7 | 76 | 00 | 79 |
|       8.40 |  |  |  | 00 | 76 |
|  |  |  |  | 02 | 76 | speed profile 8 hours

| 100 % | 50% |  |  |
|---|---|---|---|
|  |  | 113 - 125 | 05  77 |
|  |  | 101 - 112 | 05  71 |
|  |  | 89 - 100 | 06  69 |
|  |  | 71 - 88 | 02  81 |
|  |  | 56 - 70 | 00  86 |
|  |  | 41 - 55 | 02  87 |
|  |  | 21 - 40 | 04  90 |
|  |  | 1 - 20 | 01  49 |
|  |  |  | 00  03 | location      date      signature

*ready time or driving time

TACHOGRAPH FOR MOTOR VEHICLES

BACKGROUND OF THE INVENTION

This invention relates to tachographs for motor vehicles, and particularly to tachographs for use on motor vehicles, such as trucks driven by professional drivers, for the purpose of recording data such as the time of day, the date, the driver's service hours, the driver's driving times, the driver's standby times, the driver's rest times, the distance driven, and the speed driven.

The invention is particularly directed to such tachographs using various signal transmitters for obtaining the data, and a microprocessor for utilizing the data to determine other data such as distance and speed.

Tachographs of this type are often legally prescribed for various types of motor vehicles to acquire data describing the transport services being performed in such a way that the data satisfactorily takes into account the interest of the drivers, their employers, and the regulatory agencies involved. The required data should offer the drivers proof of service or work time which is easily readable at any time, that is, readable at any time without technical input, preferably in the form of "hard", i.e. printed, copy. The data should enable those in charge of a carpark or garage to easily monitor the business use of the vehicles, and the organizational consequences resulting from such use. The data should permit the official regulatory agencies a quick overview of the driver behavior and adherence to work time guidelines, safety regulations, and what is called in some jurisdictions "social regulations". This information should be available to the agencies during their examinations, which are generally conducted as random samplings or spot checks.

This type of information has in the past been gathered with so-called disk graphs (sometimes called tachograph charts or record charts) in the form of polar-coordinate hard copy disks which utilize the angular displacement as time. An analog radial displacement is indicative of such data as speed, distance, fuel consumption, engine rotation rates, etc. Such disk graphs have dispensed with the troublesome keeping of driving logs, and allow consistent recording of data such as speed, distance, fuel consumption, engine rotation rates, work-time data, driving time, ready periods, and rest times. These are accomplished on a real time or clock time basis in analog form. Such disk graphs or diaphragm disks are, per se, documents with high density information which is easy to handle, easily capable of being filed, and visually readable at all times. They are capable of mechanical evaluation, although at considerable cost. Such data carriers or data copies in the form of disk graphs are also distinguished by the fact that all driving data of a transportation commission, a shift, or a work day, can be overseen at a glance. Furthermore, in identifying each data carrier with a person or driver, the disk graphs are adapted in a particular manner to the requirements of the practice of motor vehicle transportation with respect to changes of driver in vehicle.

The weaknesses of systems using diaphragm disk or disk graph data carriers reside chiefly in the recordings themselves. The weaknesses are revealed during random spot checks of such data as rest periods to be observed, when one wishes to gather numerical information from the drive data recording in analog form on the disk graphs. These analog numbers are reliable to some extent. Any resulting errors can be prevented only with a substantial expenditure of time and evaluation experience. However, the reconstruction of the speed history of a vehicle before an accident situation is practically impossible. This is because the usual disk speed of one revolution per twenty-four hours, furnishes a relatively low resolution of the speed recordings, and requires considerable evaluation experience, and costly measuring instruments.

This compromise of fixing the recording time horizon, i.e. the overall recording time of a disk graph, at twenty-four hours is understandable for practical reasons. However, many jurisdictions have a legal requirement that the disks of the two preceding days must be available for inspection by the driving personnel, must be taken into account as a further disadvantage.

Moreover, acquiring drive data from a disk graph, fails to correspond to modern ideas concerning the handling of hard copy data. Thus, it is also understandable from this viewpoint, if the drivers have little affection for the tachograph in general. Aside from the fact that the driver must enter his personal data, and possibly other data, by hand before mounting the disk graph onto the tachograph, the tachograph must be opened, the disk graph must be threaded into the centering and carrying spindle, and the cover of the tachograph must be closed again. This assumes that the tachograph is equipped with a disk graph fastening arrangement which becomes effective automatically when the cover is closed. Otherwise, the fastening operation must be performed manually. If the vehicle's driver has a co-driver or "partner", as required depending upon regulations based on the tonnage or the distance to be driven, the insertion of the two required disk graphs becomes a relatively arduous and expensive procedure. It is a rather troublesome duty carried out in the morning in the cold, and usually poorly lighted driver cab. In addition, some care is required for handling of diagram disks because they must accommodate very fine speed recording traces, and are therefore equipped with a special recording layer which has the disadvantage of being sensitive to scratches and pressure.

SUMMARY OF THE INVENTION

An object of the invention is to provide an improved tachograph.

Another object of the invention is to avoid the aforementioned deficiencies.

Still another object of the invention is furnish a tachograph that to avoids the deficiencies of diaphragm disk recording, but which can receive driver-directed data carriers enabling changes of driver and vehicle in a manner analogous to previously conventional driving data acquisition devices, and which at all times permits a correct clock time or real time drive data output which is particularly useful to drivers and administrative agencies, without requiring additional technical evaluation expenditure for its interpretation.

According to a feature of this invention, the tachograph is equipped with a printing device, and a semiconductor memory with the driver's identification card serves as a memory, while the work-time data and drive data are written into defined memory areas of the data memory along with specific data relating to the driver which is already entered when the data card is inserted into the tachograph, and readout of the data memory and print out of a tabular drive record are triggered by feeding a sheet-type paper into the feed slot in the front of the tachograph.

According to a preferred embodiment of the invention, each operating change entered into the tachograph, either from the vehicle's drive train or by hand, transfers the values of the working time data occurring at that moment into the data memory in correct clock time or real time, and an additional memory area in the data memory continuously records at least speed measurement values in intervals of one second, in accordance with the order of magnitude, while a predetermined quantity of work-time data records filed in the data memory generates a request for triggering a driving record printout. The printout provides a substantially rectangular paper or print carrier that carries the drive record with two equally wide adjoining table sections that include work-time data records, and a speed profile chart, and a table section containing speed measurement values and having a total height equal to the height of the two other table sections.

According to a feature of the invention, the front face of the tachograph includes a keyboard for receiving data.

The invention satisfactorily achieves it objects with surprisingly low expenditures, particularly by requiring only one drive data acquisition and drive record output device which, because of the keyboard, and the front feed slots for the print carrier and cards, is particularly flat and accordingly, well suited for installation in a dashboard. In addition, the invention provides the advantage of preserving the drive data acquisition, which is customary per se, with mobile driver-related carriers. Hence, no noteworthy expenditure on adaptation to a new system is required, aside from the obvious handling changes.

These and other features of the invention are pointed out in the claims. Other objects and advantages of the invention will become evident from the following detailed description when read in light of the accompanying drawings.

BRIEF DESCRIPTION OF THE DRAWINGS

FIG. 4 is an illustration showing a drive record.

DETAILED DESCRIPTION OF THE PREFERRED EMBODIMENTS

Figure 1:
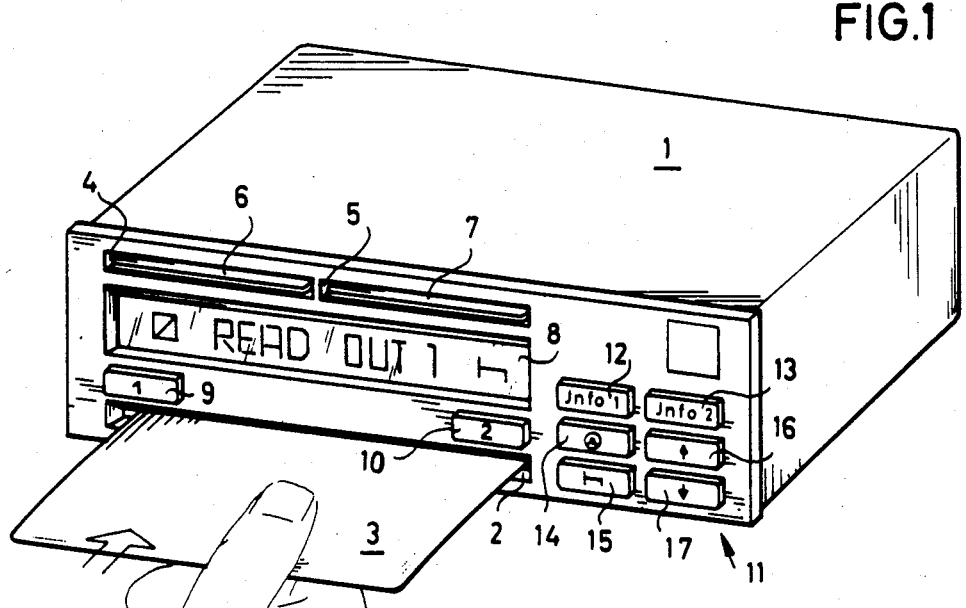
FIG. 1 is a perspective drawing of a tachograph embodying the invention.

As shown by FIG. 1, the tachograph according to the invention has an installation housing 1 which is suitable for mounting in the dashboard of a vehicle. The front of the housing forms the opening of a front feed slot 2 for receiving a sheet-type print carrier 3, openings of receiving slots 4 and 5 which accept the insertion of the drivers' data cards 6 and 7 constructed, for example, according to FIG. 2, as well as a display device 8 in the form of a line display. In addition, keys 9 and 10 are assigned to respective drivers to feed in the work states "ready period" and "rest time". The tachograph automatically recognizes the driving periods. By actuating a key 12 or 13 corresponding the driver's or co-driver's activity at the moment, each driver can have a drive record printed out by a keyboard 11 when he (or she) introduces a print carrier 3 into the front feed slot 2 and/or when he actuates a key 14 provided with a drive time symbol. In addition, the driver can obtain a display for the length of time he has already driven the vehicle or the time the driver can drive until the next drive period interruption is due. On the other hand, if the driver actuates a key 15 provided with the reset period symbol he can display, for example, how much work time remains until the daily or periodic rest period must be observed. The keys 16 and 17 are used for selection and visualization of the work time data records written into the data cards 6 and 7.

Preferably, the system program of the tachograph is structured such that the tachograph guides the driver and promptly furnishes the driver with a visual display, and an acoustical prompt, that signals the driver to avoid violations against the safety regulations and work rules. For example, the signals may inform the driver that it is time to take a break after a four-hour uninterrupted drive, that the work time is concluded, that the maximum allowable driving distance has been reached and a change of drivers is due or, in order to ensure a consistent documentation of the drive data, that a printout of a drive record must be made.

FIG. 1 shows the latter state, i.e. the driver 1, who has driven or will drive the vehicle, is required in plain language to insert a print carrier 3 which is drawn in by the tachograph and imprinted with the drive record. The usual symbols display that ready time, which is evaluated as work time, for driver 1, and rest time for driver 2, the co-driver, are entered or written in the data memory of the respective data cards 6 and 7 when the data cards 6 or 7 are removed from the tachograph or when the tachograph receives information that the work time has changed. The latter information is applied by actuating the keys or automatically, i.e. in dependence on the drive, with a drive time symbol being displayed for driver 1.

Figure 3:
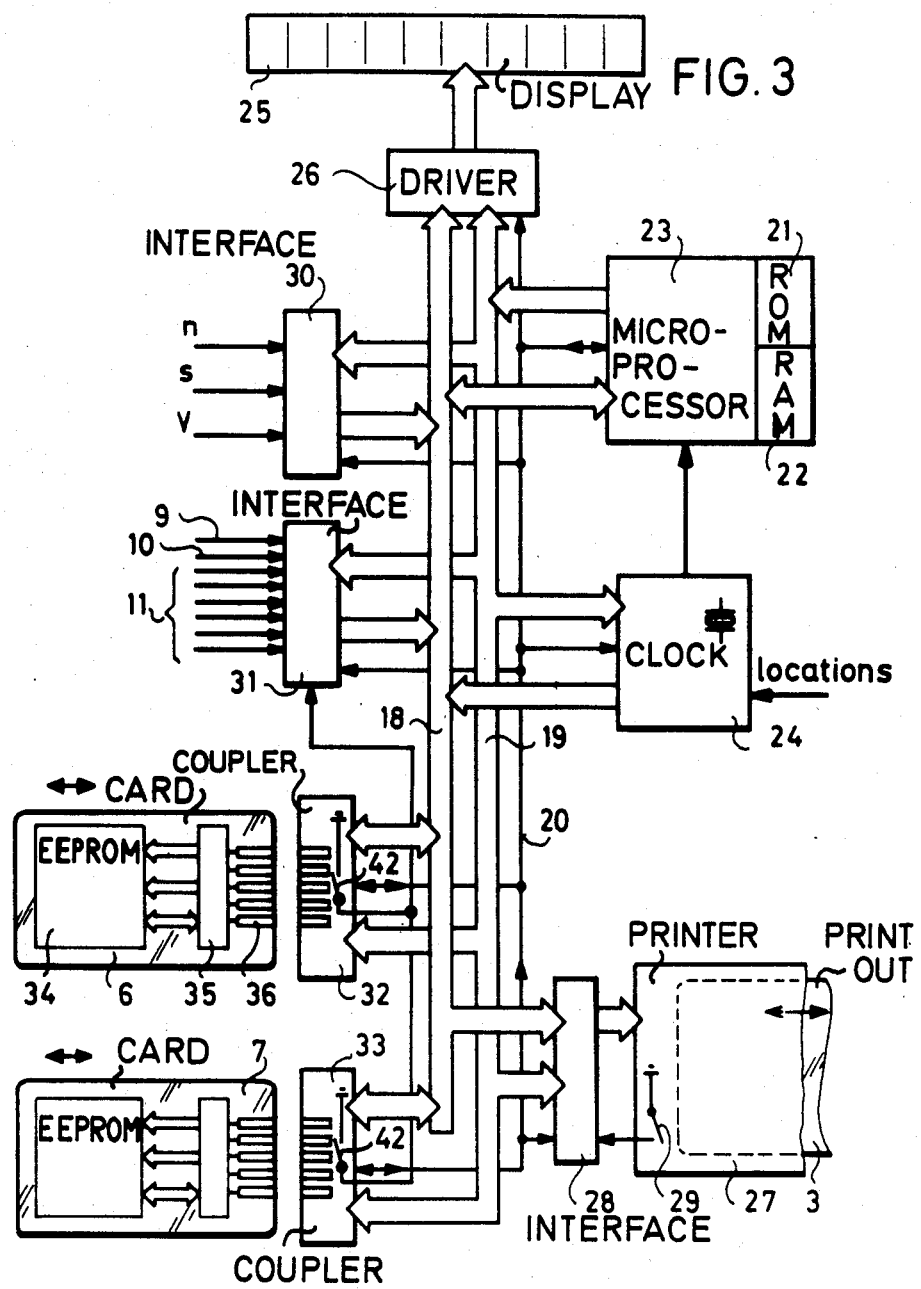
FIG. 3 is a block diagram showing the different structural components of the tachograph.

The block diagram, FIG. 3, shows that the different functional assemblies of the tachograph, according to the invention, are connected with one another via a bus system composed of a data bus 18, an address bus 19, and a control bus 20. In particular, the tachograph includes a microprocessor 23 comprising a ROM 21 in which the system program is loaded, and comprising a RAM 22, which serves as a work-time memory and is preferably maintained by means of a maintaining battery, not shown. The maintaining battery serves to maintain a voltage supply for the RAM, and thus make it non-volatile. A clock or time data transmitter is designated 24. A display device 25 produces an alphanumeric display and which is connected with the bus system 18, 19, 20 via a multiplexing driver 26. A printing driver 27 preferably of the thermal printing type is series connected to an interface circuit 28 and includes a switch 29 which is actuatable by means of a print carrier (hardcopy) 3. An interface circuit 30 couples various transmitters of quantities to be measured, for example, the rate of engine rotation, the fuel consumption and the distance covered. An interface circuit 31 connects static transmitters, particularly the keyboard 11 and the keys 9 and 10, with the bus system 18, 19, and 20. Coupling devices 32 and 33 receive the data cards 6 and 7.

Figure 2:
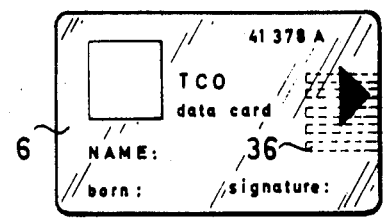
FIG. 2 is a view of a data card of FIG. 1.

Preferably, data cards 6 and 7 each include an EEPROM, as a data memory 34, and microprocessor 35 assigned to the latter. Data card 6 and 7, which are shown in FIG. 2, include a handling-direction arrow, the name and birth date and signature of the driver, and his officially registered driver number. In contrast with a battery maintained RAM, this system dispenses with buffer action. Although done at the cost of a limited operation duration, discussed in more detail in the following, this system permits serial data transmission between the bus system and the data memory 34. Accordingly, it avoids an otherwise required multiplicity of plug contacts which are susceptible to wear. A plug contact 13 is shown at 36. In addition, the microprocessor 35 contains program sequences which serve for data encoding, and it can be used for the purpose of transferring functions of the microprocessor 23 into the data card 6 and 7.

As can be seen from FIG. 4, the tabular print-out of the data of the drive record is applied onto the rectangular print carrier 3 substantially within a simultaneously produced network or field 37 which, aside from a heading section 38, in which designations of the date are printed out, forms three table sections. Two equally wide table sections 39 and 40, which adjoin one another in the vertical format, serve for receiving the work-time data records on the one hand, and a speed profile diagram on the other hand. A table section 41, which corresponds to the total height of the two table sections 39 and 40 and is located at the side of the latter, shows speed measurement values. In addition, the drive record is composed of two title lines, not designated in more detail, which include the record number, the output date, name and birth date of the driver and his drivers license. It is also composed of a free space below, for handwritten documentation and remarks regarding specially characterized data, e.g. relevant for salary calculation, the free space being provided with the references "location", "date", and "signature".

During the print-out of the drive record, the personal data of the driver are requested from a defined memory area of the data memory 34 of the data cards 6 or 7, the identification memory. An index or modifier memory area also fixed in the data memory 34 of the data card 6, 7, includes a record counter which is increased by "1" after every drive record print-out, while the formal designations and the measurements of the network or field 37 are filed in the ROM 21 of the tachograph as background data, possibly in different variants.

It is noted here that the operating memory assigned to the microprocessor 23, the RAM 22, serves particularly to update the long term data concerning the vehicle, such as fuel consumption, kilometers or miles driven, excesses of the engine rate of rotation, and also other data important for the servicing of the vehicle. In addition, the kilometers already driven or starting mileage, and the actual clock time at every change of work shift is fixed in this memory in order that the differences with respect to the then current data states can be calculated during a subsequent change of the work state in the microprocessor 23. Moreover, the distance-dependent pulses supplied by the microprocessor 23 during the drive time, for example speed values measured with a time base of 1 second, are continuously written into the RAM 22. Various simultaneously-calculated mean speed values are entered for time compressions of different scales. In addition, the microprocessor 23 also serves to determine the information already mentioned, such as "rest driving period", "start of the daily rest period" from the work-time data stored in the data memory 34 of the data cards 6 and 7.

The work-time data records shown in the table section 39 are written into a work-time memory, an additional memory area of the data memory 34 of the data card 6 or 7. A complete work-time data record is filed in the work-time memory, in each instance, when the work state or shift changes. That is, the microprocessor 23 determines factors such as the time difference between the start of a drive, which is detected through the occurrence of "path" pulses, and leads to the formation of an address which is typical of the driving period, and the standstill of the vehicle, as well as the distance covered in so doing. After a certain waiting period, which is usually not evaluated as a driving period interruption in order to suppress stopping periods at traffic lights and in traffic jams, the microprocessor supplements the partial data record composed of clock time and device number, which is already written in at the start of the drive, to form a complete work-time data record composed of clock time, driving period, distance covered, and device number, and simultaneously stores the partial data record for the following work state or shift. The partial data record is generated for the stopping time point and includes clock time and device number.

During the acquisition of the remaining work-time data, that is the ready periods and the rest periods, the system furnishes a time delay for the supplementing process, and accordingly completion of a work-time data record and a writing in of a new partial data record in the work-time memory. This prevents the limited print area in the drive record provided for the work-time data record, table section 39, from receiving voids or false work-time data records that may result, for example, from incorrect key actuations. Only removal of a data card 6 or 7 effects completion of the running work-time data record directly by actuation of the removal switch 42. According to an embodiment of the invention, a mechanical timer delays removal of the data cards 6 and 7 to ensure a positive conclusion of the data transmission.

Furthermore, additional memory locations are reserved in the modifier or index memory to fix the quantity of work-time data records written into the work-time memory since the last drive record print-out, and a demand for the print-out of the drive record is generated promptly before reaching the maximum possible number of print lines in the table section 39. This overcomes the limited number of print lines in the table section 39 of the drive record and allows the system to meet legal or other requirements that complete work time documentation must be available for proof. According to an aspect of the invention, when the demand for print-out occurs, locking facilities lock the data cards 6 and 7 the drive record can only be removed from the tachograph when the print-out is effected. Preferably, additional memory locations are held open in the modifier or index memory to serve as an hour counter. This would satisfy another conceivable requirement that the drive records are to be produced after a certain time segment.

According to the above, the following can be seen from the work-time data records of the drive record according to FIG. 4, which was produced on 1/22/1985. This includes only the absolutely necessary data, since fuel consumption, speeding and diverse references, e.g. to non-compliance with a print-out demand, are not printed out.

The most recent complete work-time data record contains a km indication of 189.7. At time 04:58 hours (on a 24 hour time scale, e.g. 4:58 A.M.) the vehicle with tachograph No. 76 was set in motion, and driven for 3 hours and 42 minutes until it stopped at 08.40 hours (i.e. 8:40 A.M.). The previous work-time data record shows that the driver had been ready since 01:20 hours and hence, presumably active as co-driver (or the driver's partner) 3 hours and 38 minutes, and that he had previously observed a rest period of 1 hour and 30 minutes beginning at 23:50 hours or 11:50 P.M. of the preceding day. The previous work-time data record is in turn generated for a drive which began at 19:05 hours or 7:05 P.M., and during which 152.9 kilometers were covered. The uninterrupted driving period of 4.45 hours determined for this drive clearly exceeds the 4 hour limit, i.e., there is a violation of work time guidelines.

Before the drive, the driver had a rest period of 15 minutes from 08:50 hours to 19:05 hours, and before this he was obviously active as co-driver for 3 hours and 15 minutes beginning at 1500 hours or 3 P.M. During this time, a drive record was retrieved, possibly in the course of a police check or that of another authority, which is characterized by an empty line provided with a dotted line 43. The older work time data are accordingly already printed out on the drive record No. 78 of 1/21/1985. They show that before resuming his duty on 1/21/1985 at 1500 hours or 3 P.M., the driver left another vehicle with the tachograph device number 91 25 hours ago on 1/20/1985 at 1400 hours or 2 P.M. In this vehicle, he was in transit on 1/20/1985 from 09:10 or 9:110 A.M. to 13:10 hours or 1:10 P.M. for four hours, covered 184.2 km, and then carried out another activity for 50 minutes before he removed his data card from the tachograph and left his "vehicle" work area.

The interpretation of the work-time data records will cease here in order to avoid repetition, but it is still a matter of interest to know whether the driver observed the legally prescribed daily rest period in the time period interpreted; this poses a decisive question for the control or safety agencies, and can be separately removed from the driving record.

Some jurisdictions set up three daily rest period categories according to the type of conveyance and vehicle equipment. In one case, there must be 10 consecutive hours of rest time within 24 hours before starting work; in another case there must also be 10 hours of uninterrupted rest time within 27 hours, and in the third case 8 hours uninterrupted rest time within 30 hours.

Starting from the stop time of the vehicle at 08:40 hours, it can be seen that the driver would not violate the regulation only if he drives a vehicle of the latter category, which is occupied by two drivers, and must be equipped with a sleeping compartment.

With respect to the formation of the driving record, it is noted that empty lines can be provided, particularly after longer rest periods, between the work-time data records in which handwritten comments can be entered, for example, vacation, absences due to illness or work times which could not be detected by the tachograph.

A profile memory area is provided in the data memory 34 of the data card 6 or 7. The profile memory receives the values of eight predetermined speed groups. The values serve to form a speed profile, and are determined according to a specific computational mode of the microprocessor 23. The speed profile shown in the table section 40, and received over a time period of 8 hours, gives information on types of streets which were traveled, and accordingly, on the use of the vehicle. The rest period above shows that the vehicle is a heavy transport vehicle rather than a bus, and that the driver drove at excess speeds (bars 44). This factor is one which should not be overlooked.

Another memory area of the data memory 34 of the data card 6 or 7, the speed memory serves to continuously write in the speed values which are simultaneously stored in the RAM 22. That is, it serves for the real time storage of the actual speed measurement values, wherein the measurement base of one second (1 S) is a sufficient resolution for the driven speed. It also serves for accident evaluation. The storage of average speed values with a time base of, e.g., 10 seconds, which is already a considerably enlarged time based on horizon, is still relatively high in comparison to the visual evaluating ability of analogous prior art diagram disk recordings. It also provides a storage of average speed values with a time base of, e.g. 5 minutes, which allows detection of at least the driver's daily allowable driving time.

In order for the drive record to show time horizons or time bases which are as wide as possible, the table section 41 provided for the speed display corresponds to the maximum possible length in the drive record. For the sake of simplicity, only two columns of speed values are printed out in FIG. 4. Column 45 shows the actual measured speed values, column 46 shows the mean values corresponding to a time base of 10 seconds. The speeds shown are the most recent performed by the vehicle.

It can be seen from column 45 that the driver braked relatively sharply at 08:40 hours, approximately 15 seconds before the final stop, and afterwards performed two braking pumping movements with the vehicle. It is also conceivable that emergency braking was necessary because the wheels locked and the vehicle could only be brought to a standstill after two additional applications of the brakes.

This speed information, which is decisive for a possible accident evaluation, and for which neither special devices nor specialists are required, should, of course, not be erased from the speed memory by generating additional 00 speed values. Therefore, the system interrupts the reading in of 00 speed values after, e.g. five 00 speed values, i.e. when the standstill of the vehicle can clearly be assumed, and the start time is again read into the speed memory when the vehicle is started again.

For the sake of completeness, it should be noted that the real time storage of the speed measurement values every second in the data memory 34, for realization of a satisfactory time base, requires in a considerable memory. However, this is only available tentatively because of the rest of the memory tasks and the limited total memory capacity of 2K bytes. On the other hand, the operating memory duration of EEPROMs is limited, namely, by a predetermined quantity of erasures and memory locations. Hence, with a give memory location, a compromise must be found between the operating duration of the data cards 6 and 7 and the time base of the real time storage of the speed measurement values, i.e. the accuracy of the speed measurement. The latter is of considerable importance with respect to a reliable accident evaluation.

The following rough estimate shows the relations:

| | |
|---|---|
| Assuming the driving time/week | 48 hours |
| then, per year, it would amount to | 45 × 48 = 2,160 hours |

-continued

| | |
|---|---|
| The quantity of the erasure cycles/ memory locations can be assume today at | 50,000. |
| The desired operating duration of the data card 6, 7 should amount to at least | 3 years. |
| As a result, a time horizon (base) is to be realized on the data card amounting to | $T = \frac{3a \times 2160 \text{ h}}{50,000} =$ 466 seconds |
| With a measuring clock of one cycle per second, this time base requires a memory of | 466 × 8 bits. |

This memory requirement can be easily realized on the data card so that an operating duration of 4 years can also be available, all things remaining the same.

This computation example further shows that the operating duration of the data cards 6 and 7, or the data memory 34, and the time horizon to be realized are directly proportional. If, for example, a higher measuring accuracy is desired, either the expectations of the operating duration are curtailed, or more memory locations must be provided. In other words, the limited memory capacity of the data cards 6 and 7 results in a limited operating duration, and this magnitude must be monitored in a suitable manner. The total driving time, which is cumulative with respect to hours and for which the required memory location must be held ready in the modifier memory, is available as a measurement for this. However, the operating duration of the data cards 6 and 7 with the data memory 34 is determined by means of the contact elements for which, at this time, a quantity of 5,000 connections or insertions are indicated. In order to monitor this, the system makes sufficient memory locations available in the modifier or index memory.

Accordingly, memory locations are to be held ready at least in the modifier or index memory for the cumulative total driving time and the quantity of card connections or insertions. These serve as characteristic magnitudes for the operating duration of the data cards 6 and 7 on the one hand. On the other hand, the quantity of work-time data records, the quantity of printed out drive records, and the time after the last drive record print-out serve as characterizing magnitudes for a continuous work time documentation.

As stated, the EEPROMS of cards 6 and 7, permit only a limited number of overwriting operations, and have a relatively small memory capacity, i.e. there exists an operating duration problem in the EEPROM data memory implanted in the data cards 6 and 7. Hence, it is advisable that the data of the modifier or index memory, and preferably the data of the profile memory, not be updated in the data memory 34 of the data cards 6 and 7, but rather, that the work memory of the tachograph, the RAM 22, be used for this. According to an embodiment of the invention the RAM 22 is used for this purpose. The respective actual data states are only written into the memory areas of the data memory 34 of the data cards 6 and 7, which are held ready, when the data cards 6 and 7 are to be removed from the tachograph. This is signaled by actuating the removal switch 42. On the other hand, when a data card 6 or 7 is again introduced into the same or another tachograph, the data of the modifier or index memory and of the profile memory, is loaded back into its work memory and is updated or newly provided there.

According to the invention, the drive record is reproducible at all times in plain language, as well as in machine readable form. The record is optimized in terms of the interest of the driving personnel, the business in charge of the garage, and the official regulatory agencies, with respect to the presentation of data and the availability to all. In particular, it provides an easily readable proof of work time and service. Also, it offers the possibility of determining the speed picture before an accident or a near accident situation. It offers those in charge of the carpark or garage an overview of the driving behavior of the driver, and the workload or use periods of the vehicles. This overview is immediate, and often sufficient because of the enlarged time base or horizon compared to that of conventional disk graphs. It offers the official regulatory agencies the possibilities of reconstructing the force of speeds before an accident, and of producing a duplicate of the driver record without requiring additional technical auxiliary means for this purpose. Moreover, the drive record, which is constructed in a particular manner so as to suitable for monitoring or checking, makes it easier for the regulatory agencies to check that safety and social regulations as well speed limits are observed.

In addition, it is noted that the previous danger of manipulation and loss of driving records is extensively reduced by a continuous numbering of the drive record which is possible without special expenditure, and can be supplemented by official registration of the data cards. Another advantage of the invention resides in that the driver in every vehicle equipped with the corresponding tachograph is not only automatically guided by means of the display device assigned to the tachograph, but can himself also request preventive information at any time. This preventive information can, for example, be the specially critical work-time data, daily driving time, daily rest time, and uninterrupted driving time.

In addition, a data card with a semiconductor memory, when compared with a magnetic memory data card or the like, has a greater memory capacity, and is more secure from disturbance and counterfeiting. Aside from the plug contacts, it is not burdened by the problem of abrasion and resistance. On the other hand, it requires no movable converter for writing and reading data. Superimposed writing caused by impact in case of an accident, something that often makes exact evaluation of diaphragm disks or disk graphs impossible, are eliminated.

Furthermore, currently available data cards with 2K byte data memories make the time base or horizon of the storable work-time data and speed values considerably greater than can be shown, or should be shown for the sake of clarity, with a handwritten driving record. Because of the discovered data optimization, these means allow the data card also to be used as a data carrier for the carpark or garage organization, when, for example, different data relating specifically to the vehicle, e.g., the actual mileage state, the fuel consumption, and the like, is additionally written in when the data card is removed from the tachograph. The data carrier can be read, for example, at weekly intervals at a central garage with an electronic data processor and can be evaluated together with transport documents according to the viewpoint relating to the organization of the garage.

Figure 5:
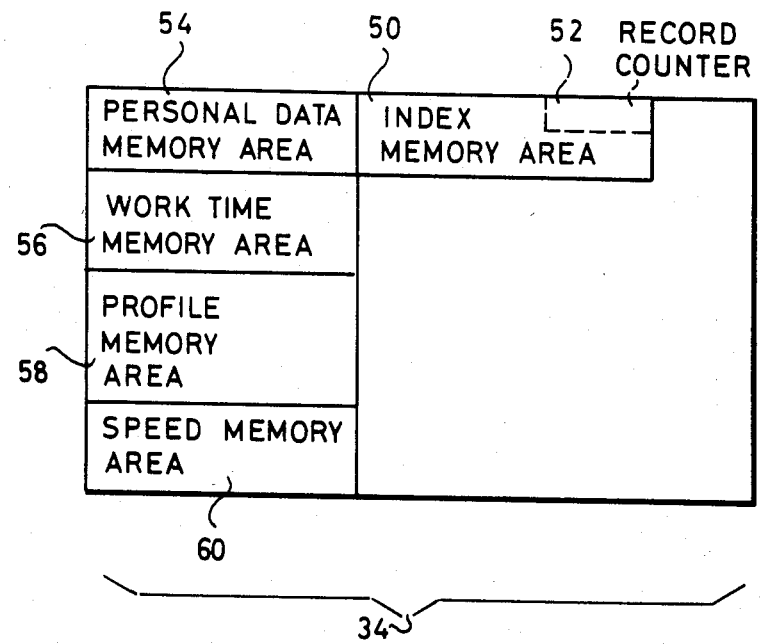
FIG. 5 is a schematic representation of memory areas in a memory of FIG. 3.

FIG. 5 is a schematic representation of various memory areas in the memory 34. The latter includes the index memory area 50, the record counter 52, the personal data area 54, the work-time memory area 56, the profile memory area 58, and the speed memory area 60. It should be noted that this showing is schematic only and does not represent the spatial distribution of these areas.

While embodiments of the invention have been described in detail, it will be evident to those skilled in the art that the invention may be embodied otherwise without departing from its spirit and scope.

What is claimed is:

1. Tachograph for motor vehicles with a microprocessor system comprising a time-and-date generator and which supplies a driver's work-time data including driving time, ready time, and rest time, determines the "distance" and speed drive data with signals from the generator, characterized in that said tachograph is equipped with a printing device, in that a semiconductor memory on a data card directed to the driver serves as a data memory in that the work-time data and drive data are entered into defined memory areas of said data memory in addition to already imprinted data specific to said driver when the data card is introduced into said tachograph and in that readout of said data memory and a print out of a tubular drive record are triggered by feeding a print carrier in sheet form into a front feed slot on a front surface of said tachograph.

2. Tachograph according to claim 1, characterized in transfer means responsive to every change of the work state entered in said tachograph by driving of the vehicle and by hand for transferring the values of a work-time data record occurring at that moment in correct clock time to said data memory and that said data memory includes a memory area for storing speed measurement values continuously written therein in time intervals of 1 second and in a sequence of magnitude.

3. Tachograph according to claim 1, characterized in means for generating a demand for initiating a drive record print-out in dependence on a predetermined quantity of work-time data records entered in said data memory.

4. Tachograph according to claim 2, characterized in means for generating a demand for initiating a drive record print-out in dependence on a predetermined quantity of work-time data records entered in said data memory.

5. Tachograph according to claim 1, characterized in means for assigning a driver switch to a print initiating switch which is actuatable by means of said print carrier.

6. Tachograph according to claim 1, characterized in that a substantially rectangular print carrier is used for providing said drive record, said print carrier having two equally wide adjoining table sections in vertical format for the printing out the work-time data records and a speed profile chart, and a third table section corresponding to the total height of the two table sections and located to the side of the two table sections for the printing out of speed measurement values.

7. Tachograph according to claim 1, characterized in a rectangular installation housing having a face in that said front feed slot for said print carrier is arranged in a plane substantially traverse to the outer face of said installation housing; and in that two receiving slots for said data card said driver are constructed in a plane parallel to said front feed slot.

8. Tachograph according to claim 1, characterized in said data memory being an EEPROM and means for determining the sum of all driving time hours fixed in a defined memory area of said data memory to determine the remaining operation duration of said data cards.

9. Tachograph according to claim 1, characterized in a work memory and means for updating the sum of all drive time hours in the work memory, said memory means having ready locations and a work location, and further characterized in means operative only when the data card is removed for loading the actual state of this data in the ready locations in said data memory of said data card and when said data card is again introduced for writing the drive data back into the work locations for further updating.

* * * * *